June 18, 1963 W. C. GUNGLE ETAL 3,094,641
FLUORESCENT LAMP

Filed April 27, 1960 2 Sheets-Sheet 1

WARREN C. GUNGLE
JOHN G. RAY
*INVENTORS*

BY
ATTORNEY

United States Patent Office 3,094,641
Patented June 18, 1963

3,094,641
FLUORESCENT LAMP
Warren C. Gungle, Danvers, and John G. Ray, Topsfield, Mass., assignors to Sylvania Electric Products Inc., a corporation of Delaware
Filed Apr. 27, 1960, Ser. No. 25,095
7 Claims. (Cl. 313—109)

This invention relates to a glass composition for use in phosphor-coated electric discharge lamps. More particularly, the invention relates to the use of a glass composition for use in an aperture type of fluorescent lamp.

An aperture lamp is a very high output type of fluorescent lamp which is designed with a phosphor coating extending part way around the lamp and in such a manner as to leave a slot of clear glass throughout the length of the lamp. The purpose of this construction is to concentrate a beam of light through the clear glass section.

It has been determined that when a lamp is made of clear glass with no phosphor coating, it will tend to discolor upon burning. This discoloration, which occurs on the inner surface of the glass envelope, is the result of a mercury-alkali reaction.

It has further been determined that the rate and density of the discoloration over the life of the lamp is proportional to the amount of alkali, specifically sodium, which is available at the inner surface of the glass to react with the mercury to form an amalgam.

Fluorescent lamps, as presently made, have electrodes, mercury vapor, a phosphor coating and use a soda-lime glass envelope material; that is, one having an alkali-soda ($Na_2O$) content higher than approximately 5%. During the lamp processing, the glass envelope is baked at a temperature of 500 to 550° C. to remove the binder from the phosphor. In addition, during evacuation, the envelope is reheated to approximately 300° C. to facilitate the removal of molecules of gas adsorbed on the glass and phosphor surfaces.

Each of these bakeouts is quite necessary; however, each tends to diffuse alkali from the glass of the envelope to the surface. During operation of an aperture lamp, mercury ions strike this alkali covering and a black-brown deposit of a mercury-alkali amalgam is formed on the clear surface. It is apparent that any dark discoloration will reduce the light transmission, since the absorbed light will be converted to heat.

While this glass envelope finds particular use in an aperture type of lamp, it is apparent that similar glass compositions may also be used in conventional fluorescent lamps with similar superior results.

It is an object of this invention to provide a lamp in which the glass envelope will not darken upon use because of the action of the mercury ions.

It is a further object of this invention to provide a glass composition for an aperture type fluorescent lamp in which the aperture does not darken upon use.

Other features, objects and advantages will become apparent from the following description, taken in connection with the accompanying drawings.

Figure 1:
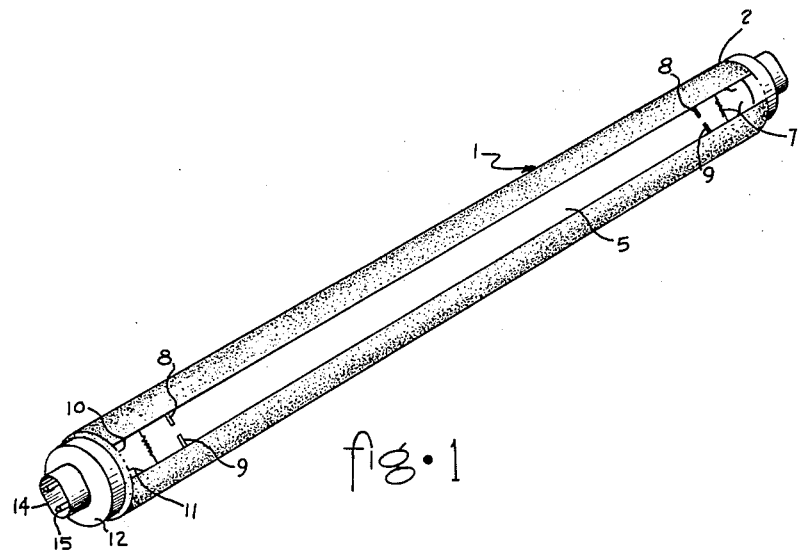
FIGURE 1 shows one embodiment of a device according to this invention.
Figure 2:
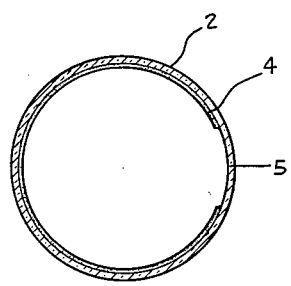
FIGURE 2 shows a cross-section through the middle of the device.

In FIGURE 1, the lamp 1 has a sealed hollow glass tube 2 containing a filling of 85% argon and 15% helium therein (although other suitable gas fillings can be used), with a sufficient quantity of mercury to produce a vapor pressure of about 10 microns. On the inside surface of the tube 2 there is a coating 4 of the phosphor, for example calcium halo-phosphate activated with antimony and manganese or any other suitable fluorescent lamp phosphor. This coating is shown in section in FIGURE 2 and extends around about 315° of the circumference of the tube, the other 45° portion 5 being left free of phosphor coating to allow the light to emerge therethrough. Other sizes of aperture, for example between about 20° and 90°, can be used, the brightness in the aperture area increasing as the aperture is reduced.

At each end of the glass tube 1, there is an electrode comprising an oxide-coated tungsten coil 7, two auxiliary anodes 8, 9 and the support and lead-in wires 10, 11 as shown, for example, in a United States patent application, Serial No. 742,928, filed June 18, 1958, by John F. Waymouth et al. for a Fluorescent Lamp. The usual insulating plastic base 12, with the boss 13 carrying contacts 14, 15 can be as shown, for example, in United States Patent 2,896,187, issued July 21, 1959, to R. B. Thomas and S. C. Shappell for a Lamp Base, or some other suitable base can be used.

The coating 4 may be applied at first over the entire glass envelope by methods well known in the art and then scraped or brushed off from the aperture 5 of the glass tube 2, as desired.

It has been determined that the use of a soda-lime glass having an antimony trioxide additive darkens at a substantially lesser rate than a soda-lime glass without the additive. This antimony trioxide additive to be effective is added to the glass at the time of batch preparation. A glass categorized as soda-lime glass would have an oxide composition generally conforming to the components listed in Table I, but without the antimony oxide.

It is to be noted that the improved glass of this invention has similar physical properties to the soda-lime glass which enables it to be used in the lamp fabricating operations currently in use, without any change in the processing steps or conditions. Such properties may be, for example, a softening point near 700° C., an annealing point about 520° C. and a strain point about 480° C.

The following table is representative of an oxide composition of soda-lime glass to which the antimony trioxide of this invention may be added.

Table I

| Components: | Percent by weight |
|---|---|
| $SiO_2$ | 60–75 |
| $Na_2O$ | 5–18 |
| CaO } MgO } | 4–13 |

Additive of this invention, $Sb_2O_3$, less than 4%.

By way of explanation, but not by way of limitation of this invention to a theory, the following is offered. It is conventional in the fluorescent lamp art to utilize a soda-lime glass in the fabrication of the lamp. This glass has many favorable characteristics such as durability and cost. It has been determined, however, that a black-brown deposit forms on the clear surface when this glass is utilized in the aperture lamp. This deposit is due to the action of the mercury vapor in the lamp on the sodium which has diffused to the surface. Because of the size of a sodium ion, it can move about the glass structure by diffusion, at relatively low temperatures. Due to the free energy of the glass surface, these diffusing ions are directed thereto. The addition of the antimony trioxide to the glass melt results in a concentration of antimony ions near the glass surface. This is a consequence of its effectiveness in reducing the surface-free energy which is due of its high dipole moment. This concentration of antimony ions near the glass surface acts as a barrier inhibiting the diffusion of other ions such as sodium. The inhibiting of the diffusion of sodium ions results in less ions present at the surface which would form a mercury-alkali amalgam. Thus, since the diffusion of the sodium is inhibited, the darkening will be lessened, due to the decreasing amalgam formation.

Figure 3:
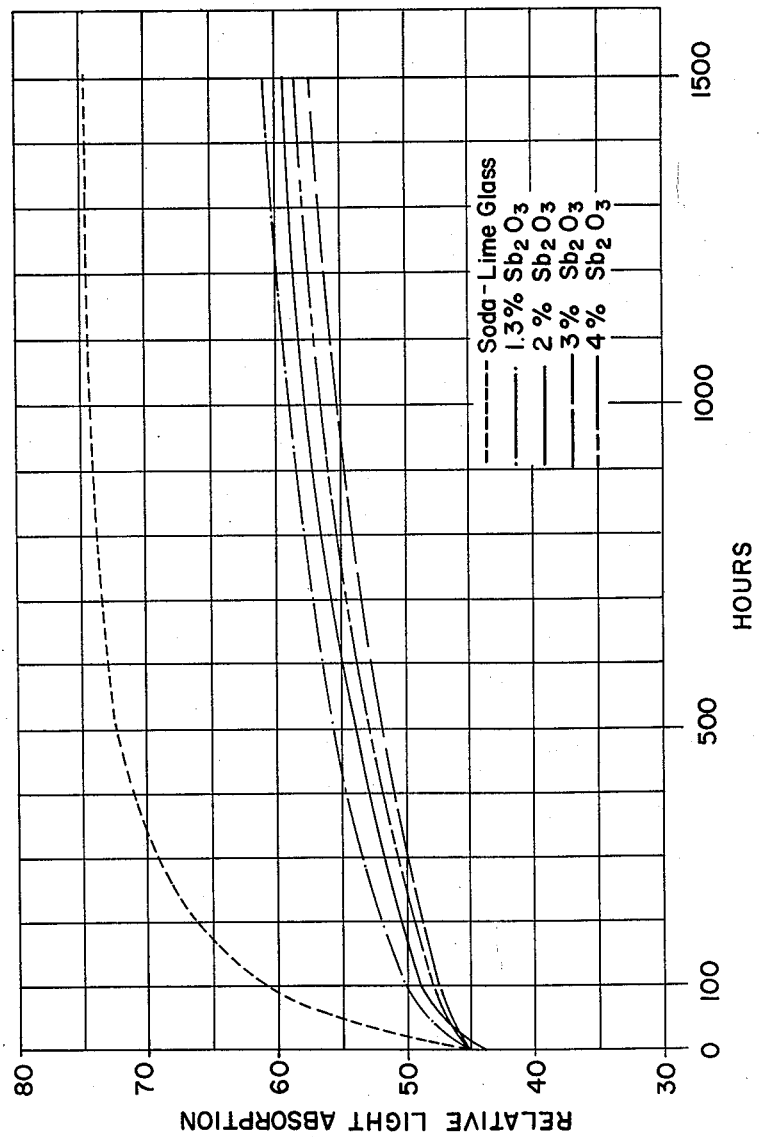
FIGURE 3 is a graph showing the decrease in relative light absorption of various antimony soda-lime glasses over a length of time as compared to the conventional soda-lime glass.

Referring to the graph illustrated in FIGURE 3 of the drawing, the relative light absorption is plotted against the hours of service. The relative light absorption is determined by measuring the amount of light which has passed through both walls of the glass envelope. An incandescent lamp is used as a light source and is positioned on one side of the glass envelope to be tested. A photocell is positioned on the opposite side of the glass envelope and is used to detect the total light passing through.

The vertical ordinary is a measure of the increasing darkness of the glass envelope. Each of the curves illustrated as $Sb_2O_3$ is an additive to the soda-lime glass, the additives containing different quantities of antimony trioxide.

It is apparent that the conventional sode-lime glass has a rapid darkening in the earlier hours of service. After these hours while the rate of darkening is decreased, the amount of darkening is already quite substantial. When utilizing the glass with the antimony oxide additive according to this invention, the rate of darkening in the earlier hours is substantially lessened. In the later hours of service, the amount of darkening is considerably less than the conventional soda-lime glass.

The amount of antimony added to the glass composition is quite important. At the lower limits of the addition there is an appreciable gain in the light transmitted over conventional glass as evidenced by the graph. When the upper limit of 4% is exceeded, the glass begins to devitrify. Devitrification is a conversion of glassy matter into a crystalline structure whereby the glass-like luster and transparency is diminished. It is apparent that any serviceable lamp must be fabricated of a glass which has essentially no devitrification.

In order to obtain maximum advantages from this invention, the amount of antimony oxide additive should be in a minor amount in the order of 1.3% by weight.

It is apparent that changes and modifications may be made by those skilled in the art within the spirit and scope of this invention. Applicants wish only to be limited in their invention by the scope of the appended claims.

We claim as our invention:

1. A fluorescent lamp comprising a glass envelope; mercury vapor and means to produce an electric discharge in said envolope; a phosphor coating on the inner surface of said envelope; said envelope comprising a soda-lime glass containing above about 5% alkali and exhibiting essentially no devitrification and having sufficient quantities of antimony trioxide incorporated therein to inhibit the diffusion of alkali ions to the surface whereby the mercury-alkali amalgam formation on the surface is reduced.

2. A fluorescent lamp comprising a glass envelope; mercury vapor and means to produce an electric discharge in said envelope; a phosphor coating on the inner surface of said envelope; said envelope comprising a soda-lime glass having less than 4% by weight of antimony trioxide incorporated therein said antimony trioxide being in sufficient quantities to inhibit the diffusion of alkali ions to the surface whereby the mercury-alkali amalgam formation on the surface is reduced.

3. A fluorescent lamp comprising a glass envelope; mercury vapor and means to produce an electric discharge in said envelope; a phosphor coating on the inner surface of said envelope; said envelope having an oxide composition of $SiO_2$ between about 60% to 75%, $Na_2O$ between about 5% to 18%, CaO and MgO about 4% to 13% and an $Sb_2O_3$ content less than about 4% but sufficient to inhibit the diffusion of alkali ions to the surface of the envelope.

4. A fluorescent lamp having a soda-lime glass envelope with an alkali content above about 5% and exhibiting essentially no devitrification, electrodes and mercury vapor in said envelope; a phosphor coating around a major portion of the inner surface of said envelope, there having been incorporated in the glass of said envelope at the time of batch formation an amount of antimony trioxide sufficient to inhibit the diffusion of alkali ions to the surface thereby reducing the formation of a mercury-alkali amalgam on the inner surface of said envelope.

5. The lamp according to claim 1 wherein the phosphor coating on the inner surface of said envelope is restricted to the major portion only, the remaining portion being free of phosphor so that light can pass therethrough without passing through the phosphor coating.

6. The lamp according to claim 2 wherein the phosphor coating on the inner surface of said envelope is restricted to the major portion only, the remaining portion being free of phosphor so that light can pass therethrough without passing through the phosphor coating.

7. The lamp according to claim 3 wherein the phosphor coating on the inner surface of said envelope is restricted to the major portion only, the remaining portion being free of phosphor so that light can pass therethrough without passing through the phosphor coating.

References Cited in the file of this patent
UNITED STATES PATENTS

| | | |
|---|---|---|
| 2,407,379 | Morehouse | Sept. 10, 1946 |
| 2,643,020 | Dalton | June 23, 1953 |
| 2,854,600 | Weijer | Sept. 30, 1958 |